Figure 1:
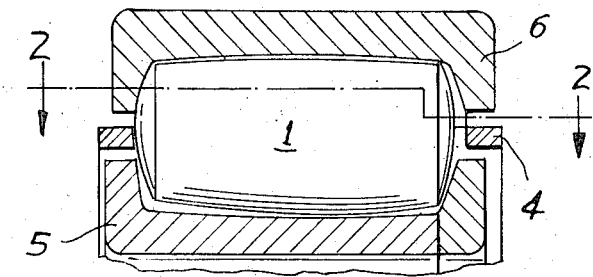

United States Patent [19]
Fernlund

[11] 3,827,771
[45] Aug. 6, 1974

[54] ROLLER BEARING

[75] Inventor: Lars Martin Ingemar Fernlund, Hindas, Sweden

[73] Assignee: SKF Industrial Trading and Development Company B.V., Amsterdam, Netherlands

[22] Filed: Sept. 21, 1972

[21] Appl. No.: 291,096

[30] Foreign Application Priority Data
Oct. 22, 1971 Sweden.............................. 13407/71

[52] U.S. Cl. ............................................... 308/212
[51] Int. Cl. ............................................ F16c 33/30
[58] Field of Search............................ 308/212, 217

[56] References Cited
UNITED STATES PATENTS
1,003,531   9/1911   Upton................................. 308/217
FOREIGN PATENTS OR APPLICATIONS
1,252,475  10/1967  Germany............................ 308/217

Primary Examiner—Charles J. Myhre
Assistant Examiner—Frank Susko
Attorney, Agent, or Firm—Howson and Howson

[57] ABSTRACT

A roller bearing assembly comprising inner and outer ring members spaced apart to define an annular space for a plurality of rollers, each of the ring members having a radially directed flange confronting the axial end faces of the rollers, said roller end faces and flange surface confronting said roller end faces being of a predetermined configuration whereby the rollers assume an essentially stable equilibrium condition tilted at a predetermined angle relative to the bearing axis during operation of the bearing under axial load and a cage having a plurality of pockets for the rollers defined in part by axially oriented bars of a configuration so that the rollers can be tilted said predetermined angle and essentially limited only by the contact between said roller end faces of the surface of said flanges confronting and engaging said roller end faces.

4 Claims, 2 Drawing Figures

ROLLER BEARING

The invention relates to cages for roller bearings with essentially radial flanges on the inner and the outer ring for taking up axial loads, in which roller bearings the roller ends and the flanges are designed so that the rollers are taking an oblique position when axially loaded. The characterizing features of the invention will appear in the following claims.

In previously known bearings of the above mentioned kind the rollers are guided by the cages so that their oblique position is limited by the space in the respective cage pockets. That is, the end or envelope surface of the rollers contacts parts of the cage, esentially the cage bars which are situated between each cage pocket, which limits the oblique position the rollers can take.

This implies a great amount of wear of rollers as well as cages and may cause a decrease of the life length of the bearing.

It has been found that in bearings of the kind mentioned above, the rollers need not be prevented from taking an oblique position by the cage, since the obliquity of the rollers is limited by the contact of their end surfaces against the flanges of the outer and inner ring respectively. If the roller ends, the roller and the flange are designed in a suitable way, the rollers will not be squeezed so that self-braking occurs in the bearing.

Figure 2:
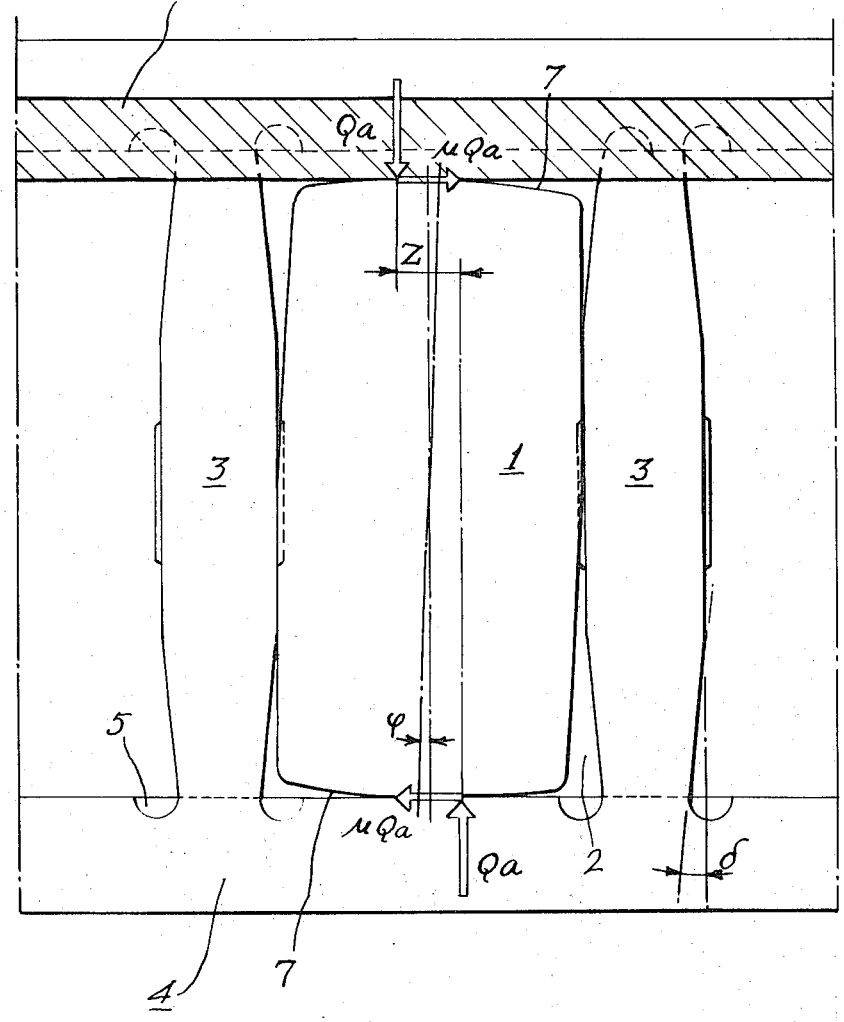

These and other objects of the present invention are hereinafter more fully set forth and described in connection with the accompanying drawing, wherein;

FIG. 1 is a transverse sectional view of a roller bearing assembly in accordance with the present invention; and FIG. 2 is an enlarged sectional view taken on lines 2—2 of FIG. 1.

The invention will now be described in connection to the accompanying drawing, which shows a principle sketch of a portion of a cylindrical roller bearing according to the invention. In the drawing a rolling body 1 is shown, which body is situated in a cage pocket 2 between two cage bars 3 constituting a part of the cage 4. On the inner and outer ring which are not shown, essentially radial flanges are provided, which in the drawing are marked by references 5 and 6 respectively. The side surfaces of these flanges which are facing the central part of the bearing are preferably tapered. When the bearing is loaded axially, these side surfaces will contact the roller ends 7 and influence these with a force $Qa$. The roller ends 7 have a spherical shape, which together with tapered flanges gives suitable lubricating conditions in the points of contact between the roller and the respective flanges. When the bearing rotates, a frictional force $\mu Qa$ occurs at each roller end because of the friction of the roller against the flanges. This frictional force tends to tilt the roller clockwise with the moment $L \cdot \mu Qa$, where $L$ = the length of the roller. When the roller has the oblique position with the angle $\phi$, the lines of action of the forces $Qa$ are displaced, and when the distance between these lines is $Z$, the roller will be subjected to a tilting moment $Z \cdot Qa$ counterclockwise.

When $Z \cdot Qa = L \cdot \mu Qa$, the roller will be in a position of equilibrium, and is then tilted an angle $\phi$. The dimensions and design of the rollers and flanges can be adapted so that the rollers take a stable equilibrium when tilted the angle $\phi$, and since the coefficient of friction $\mu$ is small in the present embodiments, there is no risk of self-braking when the rollers are squeezed. Thus, there is no need for the obliquity of the rollers to be limited by the cage in order to obtain a secure functioning of the bearing. In order to obtain this free ability to take an oblique position, in the shown embodiment the cage bars 3 are relatively thicker at their middle parts and narrowing towards their ends, so that they contact the envelope surface of the rollers in their middle parts only, for guidance of the position of one roller in relation to contiguous rollers. The bevel angle $\delta$ of the bars is depending on the angle $\phi$ of the rollers 1 in their position of equilibrium, and the possible crowning of the envelope surface of the roller.

In suitable embodiments of the invention in cylindrical roller bearings, the angle $\delta$ is between about 20' and 1°.

A cage according to the invention is of course applicable on other bearing types than cylindrical roller bearings. They can e.g. be used on tapered bearings.

I claim:

1. A roller bearing assembly comprising inner and outer ring members spaced apart to define an annular space for a plurality of rollers, each of the ring members having a radially directed flange having a surface confronting the axial end faces of the rollers, said roller end faces and flange surfaces confronting said roller end faces being of a predetermined configuration whereby the rollers assume an essentially stable equilibrium condition tilted at a predetermined angle relative to the bearing axis during operation of the bearing under axial load and a cage having a plurality of pockets for the rollers defined in part by axially oriented bars of a configuration so that the contact between rollers and cage is in a zone adjacent the middle of the cage bars and the rollers can be tilted said predetermined angle and essentially limited only by the contact between said roller end faces and the surface of said flanges confronting and engaging said roller end faces.

2. A roller bearing assembly as claimed in claim 1, characterized by that the cage pockets are relatively narrower at their middle positions and are widening towards the ends.

3. A roller bearing assembly as claimed in claim 2 wherein the side edges of the pocket confronting the rollers taper outwardly from the center portion of the bar at an angle of between about 20' and 1°.

4. A roller bearing assembly as claimed in claim 1 wherein the roller end faces are of a spherical shape.

* * * * *